United States Patent [19]
Bartkowiak et al.

[11] Patent Number: 5,282,153
[45] Date of Patent: Jan. 25, 1994

[54] ARITHMETIC LOGIC UNIT

[75] Inventors: John G. Bartkowiak, Austin; Michael A. Nix, Buda, both of Tex.

[73] Assignee: Advanced Micro Devices, Inc., Sunnyvale, Calif.

[21] Appl. No.: 44,891

[22] Filed: Apr. 6, 1993

Related U.S. Application Data

[63] Continuation of Ser. No. 783,838, Oct. 29, 1991, abandoned.

[51] Int. Cl.⁵ .................................................. G06F 7/38
[52] U.S. Cl. ........................... 364/716; 364/715.01; 364/715.08
[58] Field of Search ............... 366/715.01, 715.06, 366/715.04, 715.08, 716, 736, 737, 748, 768, 784

[56] References Cited

U.S. PATENT DOCUMENTS

| | | | |
|---|---|---|---|
| 4,682,302 | 7/1987 | Williams | 364/768 |
| 4,779,220 | 10/1988 | Nukiyama | 364/748 |
| 4,785,393 | 11/1988 | Chu et al. | 364/736 X |
| 4,945,507 | 7/1990 | Ishida et al. | 364/737 |
| 5,053,631 | 10/1991 | Perlman et al. | 364/736 X |

Primary Examiner—Jerry Smith
Assistant Examiner—Chuong D. Ngo
Attorney, Agent, or Firm—Foley & Lardner

[57] ABSTRACT

An arithmetic logic unit includes first and second buses for efficient operations upon multiple-bit operands. The arithmetic logic unit includes, in addition to the first and second buses, a shift register having an input coupled to the first bus and an output, a summer having a first input coupled to the shift register output, a second input coupled to the second bus, and an output, and an accumulator having an input coupled to the summer output and an output coupled to the first bus. The arithmetic logic unit further includes a buffer having an input also coupled to the summer output and an output coupled to the second bus. The summer provides two's compliment inversion when required and the shift register performs sign bit force zero, right shifting, and masking operations. In addition, an overflow detector and overflow correction detect and correct overflow conditions without requiring additional operating cycles.

21 Claims, 2 Drawing Sheets

ARITHMETIC LOGIC UNIT

This is a continuation of application Ser. No. 07/783,838 filed Oct. 29, 1991, now abandoned.

BACKGROUND OF THE INVENTION

The present invention generally relates to an arithmetic logic unit for performing many different kinds of digital arithmetic operations. The present invention more particularly relates to such an arithmetic logic unit for use in a digital signal processor and which performs operations such as operand shifts, operand masks, force zero, operand addition, operand substraction, and overflow detection and correction in an efficient manner.

Arithmetic logic units find application in many different kinds of digital systems such as, for example, calculators and digital signal processors. Arithmetic logic units are called upon to perform many different kinds of digital arithmetic operations. Arithmetic logic unit operations are generally performed on multiple-bit operands and may include operand shifts, operand masks, force zero, operand addition, operand subtraction, and overflow detection and correction.

Arithmetic logic units generally perform these operations under the control of operating instructions received from an instruction memory such as an instruction read only memory (IROM). Each instruction provided by the instruction memory corresponds to one operating cycle of the arithmetic logic unit. The number of operating cycles required by an arithmetic logic unit to perform its operations is very important and should be kept to the lowest number of operating cycles possible for high efficiency processing.

High efficiency arithmetic logic unit performance is most desirable where operating speed is of importance, such as in a digital signal processor application. High efficiency arithmetic logic unit performance is also equally as important where the arithmetic logic unit is utilized in portable equipment which is powered by a depletable power source such as a battery. As the number of operating cycles required by an arithmetic logic unit to perform its operations is reduced, the power consumption of the depletable power source attributable to the arithmetic logic unit is correspondingly reduced. This, as a result, extends the time of operation of the portable equipment before battery replacement or battery recharging is necessary.

The present invention provides an improved arithmetic logic unit for performing a number of different digital arithmetic operations in an efficient manner thus requiring a reduced number of operating cycles. As will be seen hereinafter, the arithmetic logic unit of the present invention can perform operand sign forcing, operand shift with or without sign forcing, operand mask, operand shift with sign forcing and two's compliment inversion, and operand addition and substraction with or without overflow detection and correction in only one operating cycle. An example of the above will be described in connection with a rather complex addition of two operands in only four operating cycles where sign forcing, operand shifting, two's compliment inversion, operand addition, and masking operations are required.

SUMMARY OF THE INVENTION

The present invention provides an arithmetic logic unit including first and second buses, a shift register having an input coupled to the first bus and an output, and a summer having a first input coupled to the shift register output, a second input coupled to the second bus, and an output. The arithmetic logic unit further includes an accumulator having an input coupled to the summer output and an output coupled to the first bus and a buffer having an input also coupled to the summer output and an output coupled to the second bus.

The shift register may be a unidirectional shift register for shifting multiple-bit data received at the shift register input to the right a number of bits responsive to shift control signals. The shift register may also extend the sign of the shifted data as the received multiple-bit data is shifted.

The shift register input may be a multiple-bit input for receiving multiple-bit data from the first bus and the shift register output may be a multiple-bit output. The shift register may include data mask means for masking selected bits of the multiple-bit data at its output. The bits masked by the data mask means preferably are consecutive bits of the least significant bits of the multiple-bit data. The shift register also may include force sign means for forcing the most significant or sign bit of the multiple-bit data to a predetermined value.

The summer may be configured for two's compliment inverting multiple-bit data received at its first input. The summer may perform the two's compliment inversion under the control of a two's compliment inversion control means coupled to the summer which causes the summer to two's compliment invert the multiple-bit data after the forcing of the sign bit of the multiple-bit data to the predetermined value.

The accumulator may store the multiple-bit data prior to and during the forcing of the sign bit by the shift register and the two's compliment inversion control means may be coupled to the accumulator for receiving the original value of the sign bit of the multiple-bit data and may be coupled to an instruction memory for receiving an enable signal from the instruction memory. The two's compliment inversion control means may be responsive to the enable signal and the original value of the sign bit being a logical one for causing the summer to two I s compliment invert the multiple-bit data at its first input.

Lastly, the arithmetic logic unit may further include an overflow detector for detecting an overflow condition and an overflow correction means coupled between the summer and the accumulator for either forcing its most significant output bit to a logical zero and all of its other output bits to a logical one or its most significant bit to a logical one and all of its other output bits to a logical zero responsive to the overflow detector detecting an overflow condition.

BRIEF DESCRIPTION OF THE DRAWINGS

The features of the present invention which are considered to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DETAILED DESCRIPTION

Figure 1:
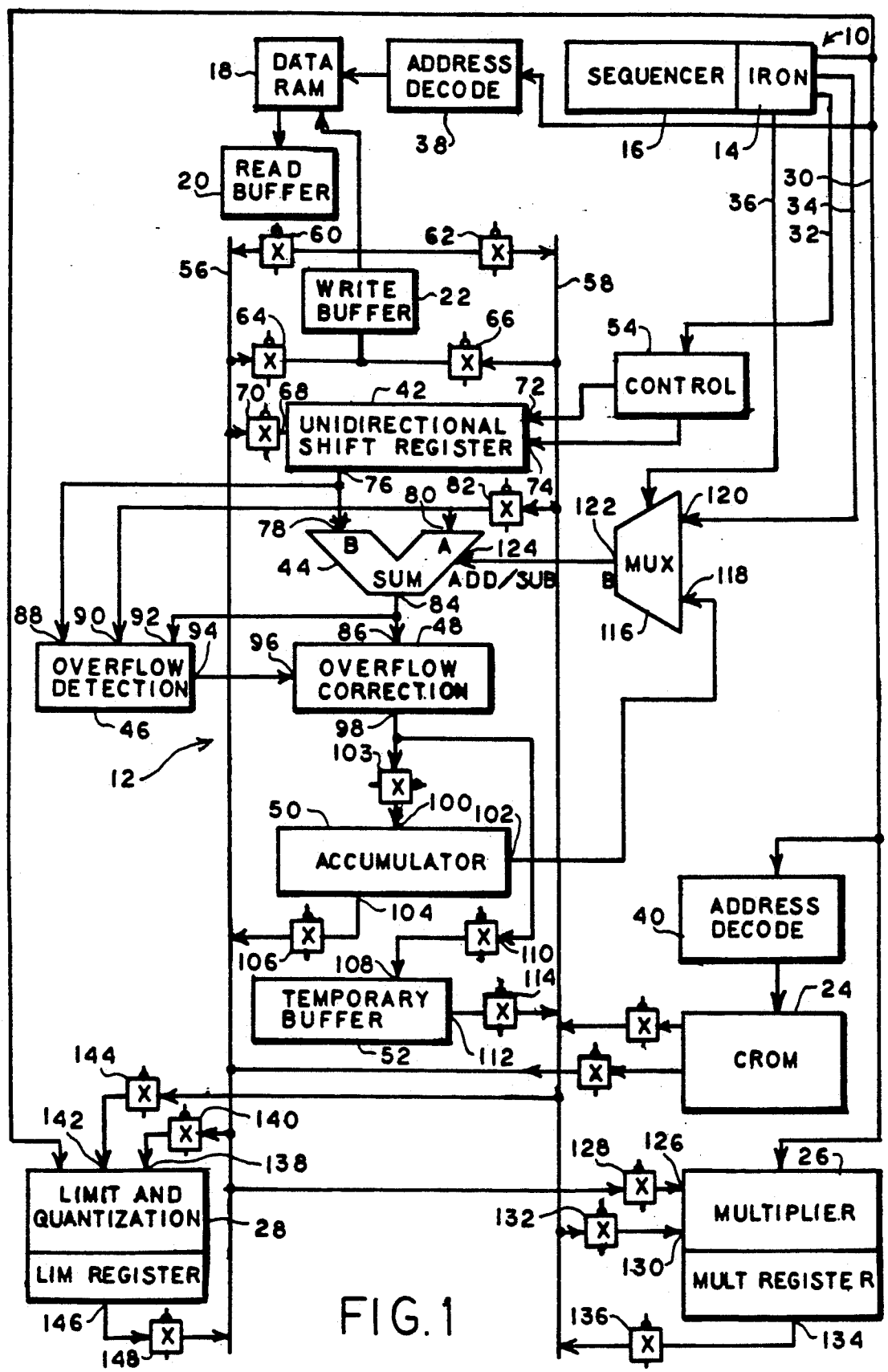
FIG. 1 is a detailed block diagram of a digital signal processor employing an arithmetic logic unit embodying the present invention.

Referring now to FIG. 1, it illustrates, in detailed block diagram form, a digital signal processor 10 incorporating an arithmetic logic unit 12 embodying the present invention. The digital signal processor 10 generally includes an instruction memory (IROM) 14 and an associated sequencer 16, a data memory 18, a read buffer 20, a write buffer 22, the arithmetic logic unit 12, a constants memory 24, a multiplier section 26, and a limit and quantization section 28.

The digital signal processor 10, and thus the arithmetic logic unit 12, performs digital processing under the control of the instruction memory 14 which provides an operating instruction during each operating cycle of the digital signal processor 10. The instruction memory 14 is sequenced by the sequencer 16 for issuing the operating instructions one at a time under the control of the sequencer 16. The instructions are provided by the instruction memory 14 over an 8-bit address bus 30, a 3-bit shift/mask control bus 32, and control lines 34 and 36. The address bus 30 is coupled to an address decoder 38 which decodes addresses for the data memory 18, an address decoder 40 which decodes addresses for the constants memory 24, the multiplier section 26, and the limit and quantization section 28. Control line 34 provides a control signal for causing multiple-bit data to be two's compliment inverted in a manner to be described hereinafter, and the control line 36 provides an enable signal which is utilized in a manner to be described hereinafter.

The arithmetic logic unit 12 includes a shift register 42, a summer 44, an overflow detector 46, and an overflow correction 48. The arithmetic logic unit 12 further includes an accumulator 50, a buffer 52, a control 54 for shift register 42, and first and second buses 56 and 58 respectively.

The read buffer 20 is coupled to the data memory 18 and to the first and second buses 56 and 58 respectively by CMOS transfer gates 60 and 62 respectively. Such CMOS transfer gates are well known in the art and, as is well known, when activated, provide a low impedance path and when deactivated provide a high impedance path or isolation. Other such transfer gates referred to hereinafter will be referred to simply as transfer gates.

Write buffer 22 is coupled to the data memory 18 and to the first and second buses 56 and 58 respectively by transfer gates 64 and 66 respectively. Shift register 42 is preferably a unidirectional shift register for shifting multiple-bit data to the right by a number of bits responsive to the shift/mask control signals provided over bus 32. The unidirectional shift register 42 and its control 54 will be described in greater detail subsequently with respect to FIG. 2. The unidirectional shift register includes an input 68 which is coupled to the first bus 56 by transfer gate 70. The input 68 is a multiple-bit input for receiving multiple-bit operand data from the first bus 56. The unidirectional shift register 42 further includes a first control input 72 coupled to control 54 and a second control input 74 coupled to control 54. Lastly, unidirectional shift register 42 includes an output 76 which is a multiple-bit output for transferring multiple-bit operand data to a first input 78 of summer 44. As will be seen hereinafter, the multiple-bit data transferred from output 76 may be either unshifted, shifted to the right, masked, or sign bit forced in a manner to be described hereinafter.

Summer 44, in addition to its first input 78, includes a second input 80 which is coupled to the second bus 58 by a transfer gate 82. The summer 44 includes a multiple-bit output 84 which is coupled to a multiple-bit input 86 of overflow correction 48.

The overflow detector 46 includes a first input 88 which is coupled to the first input 78 of summer 44, a second input 90 which is coupled to the second input 80 of summer 44, and a third input 92 which is coupled to the output 84 of summer 44. The overflow detector 46 also includes an output 94 which is coupled to a control input 96 of overflow correction 48. Overflow correction 48 includes a multiple-bit output 98 which is coupled to a multiple-bit input 100 of accumulator 50 through a transfer gate 103.

The accumulator 50 is a multiple-bit accumulator wherein the most significant bit of the accumulator is a sign bit for the multiple-bit operand data to be stored therein. The accumulator 50 includes an output 102 which provides the value of the sign bit of the multiple-bit operand data stored therein and a multiple-bit output 104 which is coupled to the first bus 56 through a transfer gate 106.

The temporary buffer 52 includes a multiple-bit input 108 which is coupled to the output 98 of overflow correction 48 through a transfer gate 110. Temporary buffer 52 further includes a multiple-bit output 112 which is coupled to the second bus 58 through a transfer gate 114. The arithmetic logic unit 12 further includes a multiplexer 116 which forms a two's compliment inversion control means whose operation will be described subsequently. The multiplexer 116 includes a first input coupled to the output 102 of accumulator 50, a second input 120 coupled to control line 34, and an output 122 which is coupled to an input 124 of summer 44.

The multiplier section 26 in addition to being coupled to the bus 30 includes an input 126 which is coupled to the first bus 56 through a transfer gate 128, a second input 130 which is coupled to the second bus 58 through a transfer gate 132, and an output 134 which is coupled to the second bus 58 through a transfer gate 136.

Similarly, the limit and quantization section in addition to being coupled to bus 30, includes an input 138 coupled to the first bus 56 through a transfer gate 140, another input 142 which is coupled to the second bus 58 through a transfer gate 144 and an output 146 which is coupled to the first bus 56 through another transfer gate 148.

The digital signal processor 10 and thus the arithmetic logic unit 12, in accordance with this preferred embodiment, performs operations upon multiple-bit operand data containing up to nineteen bits wherein the most significant bit, as originally aligned within the arithmetic logic unit 12, is the sign bit of the multiple-bit operand data and the remaining eighteen bits are available as magnitude bits. Also in accordance with this preferred embodiment, the unidirectional shift register 42 is configured for shifting the multiple-bit operand data up to seven bits to the right and masking up to eight consecutive bits of the least significant bits of the multiple-bit operand data. Also, the unidirectional shift register 42 is configured for forcing the sign bit of the multiple-bit operand data to a predetermined value of, for example, zero. The summer 44 in conjunction with the multiplexer 116 is configured for adding an operand at its first input 78 to an operand at its second input 80, subtracting an operand at its first input 78 from an operand at its second input 80, and performing a two's compliment inversion operation upon an operand at its first input 78. In accordance with techniques known in the art, the shift register 42 also sign extends the most significant bits of those operands which it shifts to the right.

Figure 2:
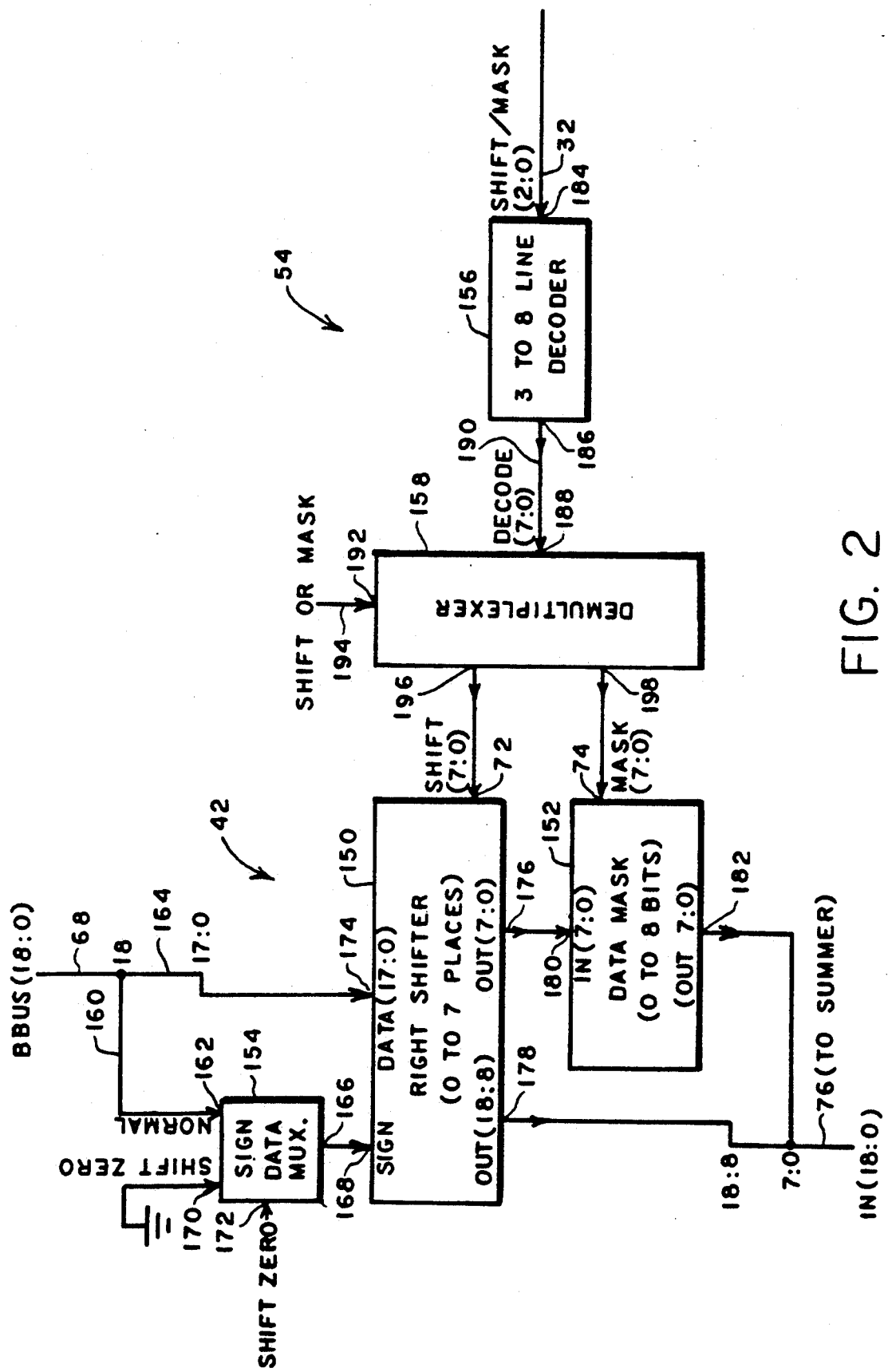
FIG. 2 is a detailed block diagram of the unidirectional shift register and its related control illustrated in FIG. 1.

Referring now to FIG. 2, it illustrates in greater detail the unidirectional shift register 42 and the shift/mask control means 54 illustrated in FIG. 1. The unidirectional shift register 42 generally includes a right shifter 150, a data mask 152, and a force sign means 154 in the form of a sign data multiplexer. The shift/mask control means 54 includes a decoder 156 and a demultiplexer 158.

The input 68 of the unidirectional shift register 150 is divided such that the nineteenth bit (sign bit) is conveyed over a line 160 to an input 162 of the data sign multiplexer 154. The output 166 of the sign data multiplexer 154 is coupled to the nineteenth bit input (sign bit input) 168 of the right shifter 150. The sign data multiplexer 154 includes another input 170 which is coupled to ground potential and a control input 172 which is coupled to the instruction memory for receiving a force sign control signal from the instruction memory. The other eighteen bits of input 68 are coupled by a bus 164 to an 18-bit input 174 of the right shifter 150.

The right shifter 150 includes a pair of multiple-bit outputs including a first output 176 which provides the first eight bits and output 178 which provides the last or more significant eleven bits. The output 176 is coupled to an 8-bit input 180 of data mask 152. Data mask 152 includes an 8-bit output 182 which is combined with the output 178 of the right shifter for providing the 19-bit output 76.

Decoder 156 includes a control input 184 which is coupled to the control bus 32 for receiving the shift-mask control signals from the instruction memory and an 8-bit output 186 which is coupled to an 8-bit input 188 of demultiplexer 158. The decoder 156 receives the 3-bit shift/mask control signals from the instruction memory 14 and decodes those signals to generate an intermediate control signal over an 8-bit bus 190 indicative of the number of bits in which operand data is to be shifted to the right or the number of bits of a multiple-bit operand to be masked. The demultiplexer includes a control input 192 which is coupled to the instruction memory 14 over a line 194 for receiving a shift or mask control signal. When the demultiplexer receives a shift control signal from the instruction memory, it will convey the intermediate control signals on line 190 to its first output 196 to be conveyed to the shift control input 72 to control the right shift. Similarly, if the input 192 receives a mask control signal, it will couple the intermediate control signals on line 190 to its second output 198 to be conveyed to the mask control input 74 of data mask 152 to control the masking operation.

With further reference to FIG. 2, when the shift register 42 is to perform a force zero on the sign bit of a multiple-bit operand, the operand is received at input 68 with the sign bit being conveyed to input 162 of the sign data multiplexer 154 and the remainder of the bits of the multiple-bit operand conveyed to input 174. The sign data multiplexer 154 receives at its control input 172 a force zero control signal from the instruction memory causing the sign data multiplexer 154 to select input 170 for forcing the sign bit at output 166 to a logical zero. The logical zero sign bit is conveyed to the input 168 of the right shifter. Such a force zero of the sign bit may be required when a multiple-bit operand is in signed magnitude format and is a negative number which needs to be converted to two's compliment format by the summer 44 in a manner to be described hereinafter.

For providing a shift operation to a multiple-bit operand, the multiple-bit operand is received at input 68. Again, the sign bit of the multiple-bit operand to be shifted is conveyed over line 160 and to input 168. The sign bit may be either forced to zero or unchanged by the sign data multiplexer 154. The remainder of the bits of the multiple-bit operand (the magnitude bits) are received at input 174. The shift or mask control signal on line 194 will indicate a shift operation which is normally the case unless a mask operation is to occur. The instruction register will provide over bus 32 a three bit binary number indicating the number of bits that the multiple-bit operand is to be shifted to the right. The multiple-bit operand may be shifted from zero to seven bits to the right by the right shifter 150. This corresponds to the three bit shift/mask control signal over bus 32 being anywhere between 000 and 111 at input 184 of the 3 to 8 decoder 156. If, for example, the multiple-bit operand is to be shifted two bits to the right, the 3-bit control signal at input 184 will be 010.

The 3-bit control signal at input 184 is decoded by decoder 156 to form the intermediate control signal on bus 190. Because the demultiplexer at input 192 receives a shift control signal from the instruction memory, the intermediate control signal on lines 190 will be conveyed to output 196 and to input 72 of the right shifter 150. The right shifter thereafter shifts the multiple-bit operand two places to the right and, while conducting such shifting, sign extends the multiple-bit operand. In other words, the seventeenth, eighteenth, and nineteenth bits will all contain the sign of the multiple-bit operand which has been shifted. If the sign bit had been forced to zero by the sign data multiplexer 154, the sign bits will be all zeros.

For masking a multiple-bit operand at input 68, again, the sign bit is received at input 168 and the magnitude bits are received at input 174. The shift or mask control signal on line 194 will indicate a mask operation to input 192 of the demultiplexer 158. The shift/mask 3-bit control signal on bus 32 will indicate the bits to be masked. For example, if the 3-bit control signal at input 184 is 000, the first bit will be masked. If however the 3-bit control signal is 111, then the first eight bits of the shift register output will be masked.

The decoder provides the intermediate control signals to a line 190 which, responsive to the mask control signal at input 192, causes the demultiplexer to transfer the intermediate control signals from its input 188 to its output 198 and to the mask control input 74 of the data mask 152. For example, if the data mask is to mask the first four bits, then the output 76 will provide an output wherein the first four bits (bits zero, one, two, and three) are all zero regardless of their original values.

The summer 44 in providing its functions of add, subtract, and/or two's compliment invert, will now be described with reference to FIG. 1. When an operand has had its sign bit forced to zero, the original operand is first stored in the accumulator 50. The original sign bit, therefore, is provided at output 102 to input 118 of the multiplexer 116. When the operand is at the first input 78 of summer 44, the multiplexer 116 responsive to an enable signal on line 36 provides a control signal to input 124 to cause the operand at input 78 to be two's compliment inverted by the summer 44. This also updates the sign of the operand to its original value and provides an operand which is properly negative in two's compliment form and which may be conveyed to input 100 of accumulator 50 or utilized by summer 44. This function may be performed even after the operand has been shifted by the unidirectional shift register 42 with the sign extended as will be seen hereinafter in the specific example.

If the operand at input 78 is to be subtracted from the operand at input 80 and is a positive two's compliment operand, the instruction memory 14 will provide over control line 34 an invert control signal to input 120 of multiplexer 116 to indicate that the operand at the first input 78 needs to be two's compliment inverted. The multiplexer 116 thereby provides a control signal to input 124 of summer 44 to cause the summer 44 to two's compliment invert the operand at input 78 so as to form a negative two's compliment operand. When the summer adds the new operand at input 78 to the operand at 80, it will in effect be subtracting the operand at input 78 from the operand at input 80. Aside from the unique arithmetic logic unit architecture of the present invention, such two's compliment inversion by a summer is well known in the art.

As previously mentioned, the overflow detector 46 detects for overflow conditions. With further reference to FIG. 1, and as previously mentioned, the arithmetic logic unit 12 has a finite multiple-bit capacity of, for example, nineteen bits. An overflow condition may result when two large positive two's compliment operands are added together to result in a small negative two's compliment result or when two large negative two's compliment operands are added together to produce a small positive two's compliment result. Both of these conditions are overflow conditions.

The overflow detector 46 by having its inputs 88, 90, and 92 coupled to input 78, 80, and output 84 respectively, examines the input operands to be added and the resulting sum. If an overflow condition is detected, the overflow detector 46 provides a control signal at its output 94 which is received at input 96 of the overflow correction means 48 which corrects for the overflow. For example, if the overflow was caused by two large positive two's compliment operands being added together to result in a small negative two's compliment sum, the overflow correction 48 will override the result and provide at its output 98 the largest positive two's compliment sum possible. In other words, the overflow correction 98 will provide a multiple-bit two's compliment sum which has a sign bit of logical zero and magnitude bits which are all logical ones.

If the overflow condition resulted from two large negative two's compliment operands being added together to result in a small positive two's compliment sum, the overflow correction 48 will override this result responsive to the overflow detector 46 to provide the largest possible negative two's compliment sum at output 98. As a result, the overflow correction will provide at output 98 a two's compliment sum which has a sign bit equal to logical one and magnitude bits which are all logical zeros.

In either of the above-noted cases, the resulting corrected sums will be conveyed to either the accumulator 50 or to both the accumulator 50 and the temporary buffer 52. This makes the resulting sums available for further processing if necessary.

The operation of the improved arithmetic logic unit of the present invention will now be illustrated in accordance with a specific example wherein two operands, x and y, are added together to form a resulting sum z. Operand x is a 15-bit signed magnitude operand which is aligned in the data memory 18 with its sign bit in bit eighteen and its fourteen magnitude bits stored in bits seventeen through four. Operand y is a 17-bit two's compliment operand which is aligned with its sign bit stored in the data memory 18 at bit eighteen and its sixteen magnitude bits stored in bits seventeen through two. The resulting sum is required to be a 16-bit two's compliment result which is aligned with its sign bit at bit eighteen and its fifteen magnitude bits extending from bits seventeen through three. The foregoing operands x and y and the required resulting sum z are illustrated in Table 1 below.

TABLE 1

| ALU Bit No. | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| x | s | 13 | 12 | 11 | 10 | 9 | 8 | 7 | 6 | 5 | 4 | 3 | 2 | 1 | 0 | | | | |
| y | s | 13 | 12 | 11 | 10 | 9 | 8 | 7 | 6 | 5 | 4 | 3 | 2 | 1 | 0 | −1 | −2 | | |
| z | s | 14 | 13 | 12 | 11 | 10 | 9 | 8 | 7 | 6 | 5 | 4 | 3 | 2 | 1 | 0 | | | |

Before the arithmetic logic unit 12 processes the operands x and y as required, the first operand x is read from the data memory 18 into the read buffer 20. Thereafter, the first operand x is transferred from the read buffer 20 to the accumulator 50 over the first bus 56, through the unidirectional shift register 42 unshifted, the summer 44, the overflow correction 48, and to the accumulator 50. When passing through the summer, the summer is provided with the operand x at input 78 and an operand of all zeros at input 80 for passing the operand x through the summer unaffected to the accumulator 50. By storing the operand x in accumulator 50, its sign is saved.

In the next or second operating cycle, the accumulator 50 drives bus 56 with the value of operand x while maintaining operand x therein. The operand x is received by the unidirectional shift register 42 where its sign bit is forced to zero as previously described making the operand x a positive operand. After the sign is forced to zero, the right shifter 150 shifts the operand x one place to the right to produce a 16-bit positive sign-extended operand. Finally, to complete this second cycle, the enable signal from the instruction memory 14 over control line 36 is applied to multiplexer 116. Simultaneously, the accumulator 50 from output 102 provides the multiplexer 116 with the original sign of operand x. If the original sign bit of operand x was a logical one denoting a negative operand, the multiplexer 116 causes the summer 44 to two's compliment invert the now 16-bit sign-extended operand x at input 78 of summer 44 to derive a new operand x which is aligned with the required resulting sum. The new operand x is transferred to the accumulator 50 and the temporary buffer 52 to complete the operation on operand x during the second arithmetic logic unit operating cycle.

While the arithmetic logic unit performs its operations upon operand x during the second operating cycle, operand y, the second operand, may be read from the data memory 18 to the read buffer 20. This makes operand y available for processing by the arithmetic logic unit during its third operating cycle.

During the third operating cycle, the second operand, y, is transferred from the read buffer 20 over the first bus 56 to the unidirectional shift register 42 where it is shifted one place to the right by the right shifter 150. Since operand y is already in two's compliment binary format, it becomes an 18-bit sign-extended two's compliment operand.

While operand y is transferred to the unidirectional shift register 42, the new operand x stored in temporary buffer 52 is transferred over the second bus 58 to the second input 80 of the summer 44. As a result, the new operand y and new operand x are added together. The new operand x and new operand y are illustrated in Table 2 below.

46 would cause the overflow correction 48 to provide the overflow correction as previously described.

While a particular embodiment of the present invention has been shown and described, modifications may be made, and it is therefore intended to cover in the appended claims all such changes and modifications which fall within the true spirit and scope of the invention.

What is claimed is:

1. An arithmetic logic unit comprising: first and second buses;
   a shift register having an input coupled to said first bus and an output, wherein said input is a multiple-bit input for receiving multiple-bit data from said first bus, wherein said shift register output is a multiple-bit output, an wherein said shift register includes data mask means coupled to said shift register output for masking selected bits of said multiple-bit data from said output by setting said selected bits to a predetermined value, said predetermined value being determined by said data mask means, and producing a masked output;

TABLE 2

| ALU Bit No. | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| New x | s | s | 13 | 12 | 11 | 10 | 9 | 8 | 7 | 6 | 5 | 4 | 3 | 2 | 1 | 0 | | | |
| New y | s | s | 13 | 12 | 11 | 10 | 9 | 8 | 7 | 6 | 5 | 4 | 3 | 2 | 1 | 0 | −1 | −2 | |

The addition of new operand x and new operand y results in a two's compliment binary sum which is 18-bits in length and sign-extended. To complete the third cycle of the arithmetic logic unit, the 18-bit sum of new operand x and new operand y is conveyed to the accumulator 50 where it is written over the new operand x which was previously stored therein during the second arithmetic logic unit operating cycle.

During the fourth and last operating cycle, the contents of the accumulator 50, which is the 18-bit sign-extended binary sum of new operand x and new operand y, is transferred over the first bus 56 to the unidirectional shift register 42. At the unidirectional shift register 42, the last three bits are masked in a manner as previously described to cause the output 76 of unidirectional shift register 42 to provide the final sum z in the required format as illustrated below in Table 3 with bit 14 within arithmetic logic unit bit 17 being an extended sign bit.

a summer having a first input coupled to said shift register output for receiving said masked output, a second input coupled to said second bus, and an output;

an accumulator having an input coupled to said summer output and an output coupled to said first bus; and a buffer having an input also coupled to said summer output and an output coupled to said second bus.

2. An arithmetic logic unit as defined in claim 1 wherein said shift register is a unidirectional shift register.

3. An arithmetic logic unit as defined in claim 2 wherein said shift register further includes a control input for receiving shift control signals, and wherein said shift register shifts said received data a number of bits to the right responsive to said shift control signals.

4. An arithmetic logic unit as defined in claim 3 further including a shift control coupled to said shift register control input for providing said shift control signals.

TABLE 3

| ALU Bit No. | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| z | | s | 14 | 13 | 12 | 11 | 10 | 9 | 8 | 7 | 6 | 5 | 4 | 3 | 2 | 1 | 0 | | |

It will be noted that the 16-bit final two's compliment sum, z, is in the required format. To complete the fourth operating cycle, the final sum, z, is transferred from the unidirectional shift register 42, through the summer 44 as previously described, through the overflow correction 48 and to the accumulator 50 where it is available for further processing if necessary. As a result, the rather complex addition previously described is completed by the new and improved arithmetic logic unit of the present invention in just four operating cycles.

During the third operating cycle when the new operand x and new operand y where added together, the overflow detector 46 could be activated to detect for overflow. If overflow occurred, the overflow detector 5. An arithmetic logic unit as defined in claim 4 wherein said shift register extends the sign of said shifted data as said received data is shifted.

6. An arithmetic logic unit as defined in claim 1 wherein said data mask means includes a mask control input for receiving mask control signals and wherein said data mask means masks selected ones of said bits of said multiple-bit data from said output responsive to said mask control signals.

7. An arithmetic logic unit as defined in claim 6 wherein said multiple-bit data includes least significant bits and wherein said data mask means masks consecutive bits of said least significant bits of said multiple-bit data.

8. An arithmetic logic unit as defined in claim 6 wherein said shift register includes a shift control input for receiving shift control signals and wherein said shift register shifts said multiple-bit data by a number of bits responsive to said shift control signals.

9. An arithmetic logic unit as defined in claim 8 wherein said arithmetic logic unit is under the control of instructions provided by an instruction memory and wherein said arithmetic logic unit further includes shift register control means having an input coupled to said instruction memory, a first output coupled to said shift register shift control input and a second output coupled to said shift register mask control input for providing said shift control signals and said mask control signals to said shift register responsive to said instructions received from said instruction memory.

10. An arithmetic logic unit as defined in claim 9 wherein said shift register control means comprises a decoder for decoding said instructions for providing intermediate control signals indicative of the number of bits of said multiple-bit data to be shifted or masked, said decoder including an output for providing said intermediate control signals, and said shift register control means further including a demultiplexer also coupled to said instruction memory for receiving a shift or mask signal from said instruction memory, said demultiplexer providing at said shift register control means first output said intermediate control signals responsive to a shift signal from said instruction memory or providing at said shift register control means second output said intermediate control signals responsive to a mask signal from said instruction memory.

11. An arithmetic logic unit as defined in claim 1 wherein said multiple-bit data includes a sign bit, and wherein said shift register includes force sign means for forcing said sign bit to a predetermined value.

12. An arithmetic logic unit as defined in claim 11 wherein said arithmetic logic unit is under the control of instructions provided by an instruction memory, wherein said force sign means includes a control input coupled to said instruction memory for receiving a force sign control signal from said instruction memory, and wherein said force sign means forces said sign bit to said predetermined value responsive to receiving said force sign control signal from said instruction memory.

13. An arithmetic logic unit as defined in claim 12 wherein said predetermined value is a logical zero.

14. An arithmetic logic unit as defined in claim 12 wherein said summer is configured for two's compliment inverting multiple-bit data received at said first input.

15. An arithmetic logic unit as defined in claim 14 further including two's compliment inversion control means coupled to said summer for causing said summer to two's compliment invert said multiple-bit data after the forcing of said sign bit to said predetermined value.

16. An arithmetic logic unit as defined in claim 15 wherein said accumulator stores said multiple-bit data prior to and during the forcing of said sign bit by said force sign means of said shift register and wherein said two's compliment inversion control means is coupled to said accumulator for receiving the original value of said sign bit of said multiple-bit data and coupled to said instruction memory for receiving an enable signal from said instruction memory, said two's compliment inversion control means being responsive to said enable signal and said original value of said sign bit being a logical one for causing said summer to two's compliment invert said multiple-bit data at said first input.

17. An arithmetic logic unit as defined in claim 14 wherein said shift register shifts said multiple-bit data to the right to provide right shifted multiple-bit data, and wherein said shift register extends the sign of said right shifted multiple-bit data with said predetermined value to provide sign extended right shifted multiple-bit data at said summer first input.

18. An arithmetic logic unit as defined in claim 17 further including two's compliment inversion control means coupled to said summer for causing said summer to two's compliment invert said sign extended multiple-bit data after the forcing of said extended sign to said predetermined value.

19. An arithmetic logic unit as defined in claim 18 wherein said accumulator stores said multiple-bit data prior to and during the forcing and extension of said sign bit by said shift register and wherein said two's compliment inversion control means is coupled to said accumulator for receiving the original value of said sign bit of said multiple-bit data and coupled to said instruction memory for receiving an enable signal from said instruction memory, said two's compliment inversion control means being responsive to said enable signal and said original value of said sign bit being a logical one for causing said summer to two's compliment invert said multiple-bit data at said first input.

20. An arithmetic logic unit as defined in claim 1 wherein said summer is configured for two's compliment inverting said multiple-bit data received at said first input and wherein said arithmetic logic unit further includes two's compliment inversion control means coupled to said instruction memory and to said summer for causing said summer to two's compliment invert multiple-bit data at said first input responsive to an enable signal and an invert signal from said instruction memory.

21. An arithmetic logic unit as defined in claim 1 wherein said arithmetic logic unit has an n-bit capacity, and wherein said arithmetic logic unit further includes an overflow detector and overflow correction means, said overflow detector having a first input coupled to said summer first input, a second input coupled to said summer second input, a third input coupled to said summer output, and an output, and said overflow correction means having a control input coupled to said overflow detector output, an n-bit input coupled to said summer output, and an n-bit output coupled to said accumulator input, said overflow correction means being responsive to said overflow detector detecting an overflow condition for either forcing its most significant output bit to a logical zero and all of its other output bits to logical ones or its most significant output bit to a logical one and all of its other output bits to logical zeros.

* * * * *